US 12,034,838 B2

(12) United States Patent
Macchetti et al.

(10) Patent No.: US 12,034,838 B2
(45) Date of Patent: Jul. 9, 2024

(54) METHOD AND DEVICE TO PROTECT A CRYPTOGRAPHIC EXPONENT

(71) Applicant: NAGRAVISION S.A., Cheseaux-sur-Lausanne (CH)

(72) Inventors: Marco Macchetti, Casnate con Bernate (IT); Karine Villegas, Boussens (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 578 days.

(21) Appl. No.: 16/095,737

(22) PCT Filed: May 18, 2017

(86) PCT No.: PCT/EP2017/061905
§ 371 (c)(1),
(2) Date: Oct. 23, 2018

(87) PCT Pub. No.: WO2017/198745
PCT Pub. Date: Nov. 23, 2017

(65) Prior Publication Data
US 2020/0287712 A1    Sep. 10, 2020

(30) Foreign Application Priority Data

May 18, 2016 (EP) ..................................... 16170236

(51) Int. Cl.
*H04L 9/08* (2006.01)
*H04L 9/30* (2006.01)

(52) U.S. Cl.
CPC .......... *H04L 9/0833* (2013.01); *H04L 9/0869* (2013.01); *H04L 9/3013* (2013.01); *H04L 2209/046* (2013.01)

(58) Field of Classification Search
CPC ... H04L 9/0833; H04L 9/0869; H04L 9/3013; H04L 9/046
See application file for complete search history.

(56) References Cited

U.S. PATENT DOCUMENTS 5,991,415 A * 11/1999 Shamir .................. G06F 7/723
                                                        713/172
6,151,395 A * 11/2000 Harkins ................ H04L 9/0841
                                                        380/28
(Continued)

FOREIGN PATENT DOCUMENTS

DE    102011115082 A1 *  3/2013  ............. G06F 7/723
EP        2326041 A1 *  5/2011  ............. G06F 7/723
(Continued)

OTHER PUBLICATIONS

Ritu Makani (2014) Enhancing security by Authenticating the Diffie-Hellman Key Exchange Algorithm using RSA. IJITKM vol. 7 • No. 2 Jan.-Jun. 2014 pp. 188-194 (ISSN 0973-4414) (Year: 2014).*

(Continued)

Primary Examiner — John B King
Assistant Examiner — Alex D Carrasquillo
(74) Attorney, Agent, or Firm — POLSINELLI LLP

(57) ABSTRACT

Public-key cryptography allows putting into practice concepts of digital signatures and public-key key exchange; methods used on a daily basis in digital systems. A method generates a protected secret value k' used as a first operand in a cryptographic group operation involving a base group element G of order n and including: generating random positive integers k1 and k2, that are strictly smaller than the order of the group element G due to a cryptographically secure random number generator, such that the generated random positive integers k1 and k2 do not share any divisor with the order n other than 1; generating the protected secret value k' based on the generating random positive integers such as k'=k1*k2, the protected secret value k' being used as a second operand in the group operation.

11 Claims, 1 Drawing Sheet

(56) References Cited

U.S. PATENT DOCUMENTS

| | | | | |
|---|---|---|---|---|
| 8,280,048 B2* | 10/2012 | Lambert | ............... | H04L 9/0891 380/46 |
| 8,682,951 B2* | 3/2014 | Boscher | ................... | G06F 7/723 708/491 |
| 8,767,955 B2* | 7/2014 | Teglia | .................... | G06F 7/723 708/1 |
| 2001/0002486 A1* | 5/2001 | Kocher | ................ | G06Q 20/367 713/171 |
| 2005/0152539 A1* | 7/2005 | Brickell | ................... | G06F 7/723 380/28 |
| 2009/0097637 A1* | 4/2009 | Boscher | ................... | G06F 7/723 380/28 |
| 2009/0122980 A1* | 5/2009 | Ciet | ......................... | H04L 9/003 380/28 |
| 2011/0170685 A1* | 7/2011 | Benteo | .................... | H04L 9/003 380/28 |
| 2011/0246119 A1* | 10/2011 | Feix | ...................... | G06F 21/755 702/117 |
| 2012/0106732 A1* | 5/2012 | Teglia | ........................ | H04L 9/06 380/28 |
| 2012/0163585 A1* | 6/2012 | Choi | ....................... | H04L 9/002 380/28 |
| 2014/0344579 A1* | 11/2014 | Struik | ....................... | H04L 9/30 713/171 |
| 2015/0333906 A1* | 11/2015 | Rahman | ................ | H04L 9/0869 380/44 |
| 2016/0277179 A1* | 9/2016 | Tunstall | ................... | H04L 9/002 |
| 2016/0352689 A1* | 12/2016 | Antipa | .................. | H04L 9/0841 |

FOREIGN PATENT DOCUMENTS

| | | | | |
|---|---|---|---|---|
| EP | 3188001 A1 * | 7/2017 | ............. | G06F 7/722 |
| WO | 98-52319 A1 | 11/1998 | | |
| WO | WO-2005043807 A1 * | 5/2005 | ........... | H04L 9/3263 |
| WO | WO-2017198745 A1 * | 11/2017 | ........... | H04L 9/0833 |

OTHER PUBLICATIONS

Vuillaume, C. et al., "Flexible Exponentiation with Resistance to Side Channel Attacks", Applied Cryptography and Network Security Lecture Notes in Computer Science, LNCS, Springer, Berlin, DE, Jan. 1, 2006, pp. 268-283, XP019034420 (Year: 2006).*

Gómez Pardo J.L. (2013) Introduction to Public-Key Cryptography: The Diffie-Hellman Protocol. In: Introduction to Cryptography with Maple. Springer, Berlin, Heidelberg. https://doi.org/10.1007/978-3-642-32166-5_7 (Year: 2013).*

Coron JS (1999) Resistance against Differential Power Analysis for Elliptic Curve Cryptosystems. pp. 292-302 (Year: 1999).*

Gomez Pardo, "Introduction to Public-Key Cryptography: The Diffie-Hellman Protocol, Introduction to Cryptography with Maple" Springer, Berlin 2013 (Year: 2013).*

Gómez, "Introduction to Cryptography with Maple." Springer, Berlin, Heidelberg; ISBN 978-3-642-32166-5, 2013 (Year: 2013).*

International Search Report and Written Opinion dated Jul. 27, 2017 in PCT/EP2017/061905 filed on May 18, 2017.

Vuillaume, C. et al., "Flexible Exponentiation with Resistance to Side Channel Attacks", Applied Cryptography and Network Security Lecture Notes in Computer Science, LNCS, Springer, Berlin, DE, Jan. 1, 2006, pp. 268-283, XP019034420.

Jean-Charles Faugére, "Attacking (EC) DSA Given Only an Implicit Hint", SAC 2012, LNCS 7707, pp. 252-274, Springer Verlag Berlin Heidelberg 2013.

* cited by examiner

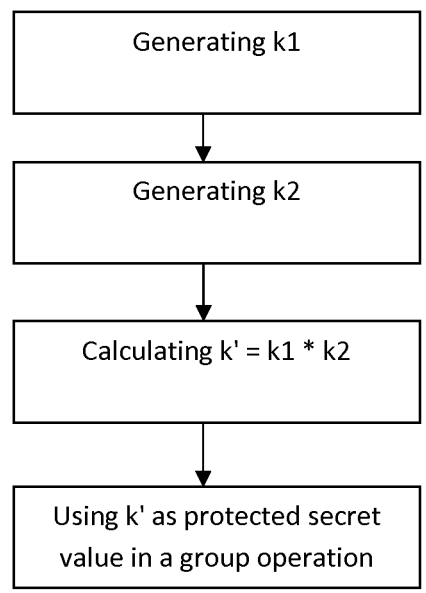

METHOD AND DEVICE TO PROTECT A CRYPTOGRAPHIC EXPONENT

INTRODUCTION

Since the publication of its principle, public-key cryptography has known important theoretical and practical developments. Notably, public-key cryptography has allowed putting into practice the concepts of digital signatures and of public-key key exchange; these methods are used on a daily basis in uncountable many digital systems.

Public-key digital signatures schemes are cryptographic algorithms that take in input a pair of cryptographic keys (Kpub, Kpriv) consisting of a public part Kpub and of a secret or private part Kpriv. These parts consist often of numerical values or of a set of numerical values. The first procedure, named signature generation, takes as input a message M that has to be signed and that has been properly encoded, for instance as a sequence of bytes, the private part Kpriv of the signature key, zero, one or a plurality of freshly generated random values R={R1, R2, ..., Rn} as well as a set of numerical values D={D1, D2, ..., Dm} that are the parameters necessary to define the mathematical domain in which the computations will be performed. All these values are processed together following a well-defined procedure sign( ) to produce a numerical value S=sign(Kpriv, M, R, D) that is called the digital signature of the message M.

Given a message M' along with its signature S, a user willing to verify the validity of the signature should proceed as follows. As a first step, the public part Kpub of the signature key has to be retrieved in an authenticated way. As a second step, a well-defined verification procedure verif( ) is run, that takes as input the signed message M', the signature value S, the public part Kpub of the signature key as well as the domain parameters D. Essentially, the verification procedure verif(M', S, Kpub, D) outputs a Boolean answer, that is either "valid signature" or "invalid signature".

A public-key signature procedure is said to be cryptographically secure if it is infeasible to forge a valid signature on a given message, or to find a second message that is different of a given message and that maps to the same signature, without the knowledge of the private key Kpriv.

Examples of standardized public-key signature schemes include for instance the RSA-PSS, DSS and ECDSA algorithms.

In a similar way, one can describe the concept of public-key key exchange algorithms. Two parties can setup a shared secret key by exchanging numerical values on a non-confidential, i.e. public, but authenticated communication channel. Typically, each party generates on its side a fresh and cryptographically secure, i.e. unpredictable, random secret value and derives from it a public value according to a sequence of predefined mathematical operations. The public values are then exchanged over the authenticated, but non-confidential communication channel and then each party mixes its own secret value with the received public values of the other party, respectively, according to another sequence of predefined mathematical operations. Eventually, the result of this operation is used either as the input of a key derivation function or in a direct way as a symmetric key for the purpose of encrypting and authenticating a communication channel using symmetric cryptographic primitives.

The domain parameters are usually a set of mathematical objects, with which the various computations are performed, that can be defined by a certain number of numerical values. Such mathematical objects have often the property of forming a cryptographic abelian, i.e. commutative group, in which it is possible to define a hard problem, like inverting a one-way function.

For instance, if q is a sufficiently large prime number, typically having a size of 2048 bits or more, and $p=2*q+1$ is also prime, such type of prime numbers are also known as Sophie-German primes, and if g is a number $1<g<p-1$ having 2q as order, i.e. 2q is the smallest positive integer such that g raised to the power 2q modulo p is equal to 1, then the set of numbers $\{1, 2, \ldots, p-2, p-1\}$ equipped with the operation that maps to an input value $1<x<q-1$ the value g raised to the power x modulo p, i.e. $g^x \mod p$, an operation named modular exponentiation, forms a cryptographic group in which computing the discrete logarithm of a random number x is infeasible, i.e. it is infeasible in practice to compute a value u such that $g^u \mod p$ is equal to n. In this scenario, the domain parameters set D is equal to $(p, p-1, g)$.

Another possible and widely used cryptographic group allowing more efficient computations is the following: if q is a sufficiently large prime number, typically having a size of 200 bits or more, and $p=N*q+1$ is also prime, typically having a size of 2048 bits or more, and if g is a number $1<g<p-1$ having order q, then the set of numbers $\{g^0 \mod p, g^1 \mod p, g^2 \mod p, \ldots, g^{(q-1)} \mod p\}$ equipped with the operation that maps to an input value $1<x<q-1$ the value $g^x \mod p$ forms another variant of a cryptographic group, in which computing the discrete logarithm of a random number n is infeasible, i.e. it is infeasible in practice to compute a value u such that $g^u \mod p$ is equal to n. In this scenario, the domain parameters set D is equal to the triplet $(p, q, g)$.

Another possible and widely used cryptographic group allowing even more efficient computations and called an elliptic curve over the finite field with p elements is the following: let p be a prime number having a size of at least 200 bits, and let be the set of the couples $(x, y)$ that are integer solutions of the equation $y^2=x^3+ax+b$, in addition with a special point called point at infinity, where a and b are fixed integer values and where all the operations are performed modulo p. The set of solutions of this equation is called the set of points on the elliptic curve E. It is then possible to define a mathematical operation taking two input points $A=(x1, y1)$ and $B=(x2, y2)$ defined on the elliptic curve E, which are possibly identical or equal to the point at infinity, and returning an output point $C=(x3, y3)$ that can be interpreted as the geometrical addition $C=A+B$ of the two input points A and B, where the computations are well-defined and are all performed modulo p. In this setting, it is possible to define an operation called scalar multiplication of a point that takes a point P of order n, i.e. such that n is the smallest positive integer such that P added with itself n times results in the point at infinity, on the elliptic curve E, as well as a scalar number u and that returns the addition of P with itself repeated u times, i.e. $R=P+P+\ldots+P=uP$. Then the operation consisting of recovering u, given two points S and P such that $S=uP$ is infeasible in practice. In this setting, the domain parameters set D is equal to the tuple $(p, a, b, n, P)$.

Other variants of well-known cryptographic groups exist. Most of the time, they involve a large set of numbers or other mathematical objects in addition to an operation involving members of this set and exhibiting precise mathematical properties. To be useful for cryptographic purposes, this operation must be easy to implement in one direction, but practically infeasible to compute in the other direction, i.e. to invert. One often calls such an operation a one-way function.

When a cryptographic algorithm must be implemented, either in the form of software running on a Central Processing Unit CPU, or in the form of a netlist loaded on an Field Programmable Gate Array FPGA, or in the form of an Application-Specific Integrated Circuit ASIC, an important step that is crucial with respect to the security, consists in implementing the part that computes the operation in the cryptographic group. As explained before, it can be a part that computes modular exponentiations or scalar multiplications of points defined on an elliptic curve. The security of such parts is of uttermost importance, as those parts must often handle cryptographic secrets as input values and these parts are threatened by so-called side-channel attacks.

Side-channel attacks aim at extracting partial or full information about secret values from physical properties measured on the implementation of the cryptographic operation. For instance, if the time, or the power consumption, or the amount of electromagnetic emanations required to perform a cryptographic operation, such as a modular exponentiation or a scalar multiplication of points on an elliptic curve, is mathematically correlated with the secret value, then it is possible to exploit this information to reveal parts of or the full value of the cryptographic secret.

An example of side-channel attack is Simple Power Analysis SPA. It exploits the fact that during a classical binary modular exponentiation or a scalar multiplication of points on an elliptic curve, the power consumed or the electromagnetic emanations by the part of the modular exponentiation or the scalar multiplication of points handling a 1 of the secret value is very different from the part of the operation handling a 0 of the secret value. A single power consumption trace is usually enough to extract a part of or the full secret information.

Another example of side-channel attack is Differential Power Analysis DPA. This attack exploits the fact that tiny differences of power consumption during a modular exponentiation or a scalar multiplication of points on an elliptic curve exist and that these differences can be extracted by combining the information provided by several traces of power consumption, thanks to simple averaging and differential techniques.

Another example of side-channel attack is formed by Correlation Power Analysis CPA. This attack aims at extracting useful information out of a physical implementation by computing the mathematical correlation between a statistical model of power consumption or electromagnetic emanations and a power trace recorded while the implementation of the modular exponentiation or the scalar point multiplication is running.

Another example of side-channel attack is formed by Template Attacks. They exploit the fact that the adversary, as a first step, has the possibility to measure the power consumption or the electromagnetic emanations when the implementation is handling known, i.e. non-secret values. This step is known as the profiling phase. Then, as a second step, the matching phase, the power consumption or the electromagnetic emanations are measured when the implementation is handling secret values. A statistical score is then constructed using this measure and all the measures produced in the profiling phase to identify and to extract useful information.

One can note that it is not always necessary to extract the full secret value to mount a successful side-channel attack. Sometimes, it is sufficient to recover only a few bits of the secret values under different run of the implementation and to combine these partial pieces of information thanks to further mathematical processing to recover the complete secret value.

When considering the attacks described above, it appears to be extremely important to protect implementations of cryptographic operations, such as modular exponentiations or scalar multiplications of points on an elliptic curve, from leaking information statistically correlated with the secret values they handle.

Many protection methods have been proposed in the past, that typically work as follows: before giving the secret value as input to the implementation of a modular exponentiation or a scalar multiplier of points on an elliptic curve, this secret value K is combined with a freshly generated cryptographically secure, i.e. unpredictable, random value R using some pre-defined protection function F to produce a protected version K'=f1(K, R) that is then handled to the cryptographic implementation. At the end of that operation, a second function is f2, that could be the identity function, is applied on the output of the implementation in order to correct the effect of applying f1 on the input. If this process is repeated with a new, freshly generated random value R for each run of the cryptographic implementation, then the adversary will not be able to obtain useful information about the secret by mounting a side-channel attack, as the cryptographic implementation is handling a value that is statistically uncorrelated from the secret.

However, it is easy to note that the main weakness of such an approach is that the secret value must be present near, either physically or timely, the implementation of the cryptographic operation, before being protected by combining the random value with the protection function. Therefore, the adversary can also try to attack the protection operation itself, instead of attacking the implementation of the cryptographic operation.

Therefore there is a need to provide a method overcoming the aforementioned drawbacks.

For this purpose, the present invention provides a method to generate a protected secret value k' used as a first operand in a cryptographic group operation involving a base group element G of an order n and comprising
  generating random positive integers k1 and k2, that are strictly smaller than the order of the group element G thanks to a cryptographically secure random number generator, such that the generated random positive integers k1 and k2 do not share any divisor with the order n other than 1,
  generating the protected secret value k' based on said generating random positive integers such as k'=k1*k2, said protected secret value k' being used as a second operand in the group operation.

According to another aspect of the invention, a secret value k may be obtained by applying a modular reduction on the generated protected secret value k' modulo the order n of the base element G.

According to another aspect of the invention, the generated random positive integers k1, k2 may have a length strictly smaller than the bit-length of the order n of the base group element G.

According to another aspect of the invention, the protected secret value k' may be used as at least one secret parameter in a Diffie-Hellman protocol.

According to another aspect of the invention, the protected secret value k' may be used as at least one secret parameter in the Diffie-Hellman protocol implemented over the group of integers modulo a prime number $p=2*q+1$ where q is also a prime number.

According to another aspect of the invention, the protected secret value k' may be used as at least one secret parameter in the Diffie-Hellman protocol implemented over the group of integers modulo a prime number $p=m*q+1$ where q is also a prime number.

According to another aspect of the invention, the protected secret value k' may be used as at least one secret parameter in the Diffie-Hellman protocol implemented over the group of points on an elliptic curve defined over a finite field.

According to another aspect of the invention, the protected secret value k' may be used as a secret random integer in a ECDSA signature scheme.

According to another aspect of the invention, the protected secret value k' may be used as a secret random value in a digital signature scheme involving at least one cryptographic group operation between a base element of order n and said protected secret value k'.

According to another aspect of the invention, the protected secret value k' may be used as a secret random value in a public-key signature scheme involving at least one cryptographic group operation between a base element of order n and said protected value k';

According to another aspect of the invention, the protected value k' may be used as a secret random value in a public-key encryptions scheme involving at least one cryptographic group operation between a base element of order n and said protected value k'.

The present invention also provides a computing device configured to generate a protected secret value k' used as a first operand in a cryptographic group operation involving a base group element G of order n and said computing device being configured to:

generate random positive integers (k1 and k2), strictly smaller than the order of the group element G thanks to a cryptographically secure random number generator, such that said generated random positive integers k1 and k2 do not share any divisor with the order n other than 1, generate the protected secret value k' such as $k'=k1*k2$, said protected secret value k' being used as a second operand in the group operation.

Thanks to the invention, there is no need to use a secret value k present in clear in or near the implementation of a modular exponentiation or a scalar point multiplication, and thus, cannot be attacked through exploiting side-channel leakages.

BRIEF DESCRIPTION OF THE FIGURES

The present disclosure will be better understood with the attached FIGURE, in which:

FIG. 1 illustrates the method according to the present invention,

DETAILED DESCRIPTION

In the following specification, two algorithms that rely on a scalar point multiplication involving a secret value will be described.

The first one is the Diffie-Hellman key exchange protocol based on Elliptic Curve ECDH. In the following specification, an elliptic curve under use is defined over the finite field with p elements, i.e. the elements of the finite field are the positive integers smaller than p and the addition and the multiplication operations are performed modulo p. It will be well understood that other types of elliptic curves can be considered as well. In that case, the elliptic curve is defined by the equation $y^2=x^3+ax+b$, where a and b are publicly and well-defined values belonging to the finite field with p elements. In addition, G is a base point of prime order n on the elliptic curve E. Therefore, domain parameters can be defined as $D=(a, b, p, G, n)$. The Diffie-Hellman key exchange protocol over an elliptic curve works as follows: in a first step, a secret positive integer i is generated, and is strictly smaller than the base point order n with help of a cryptographically secure random number generator. In a second step, the public point $I=i*G$ is computed. The integer i will be the secret key and the point I will be the public key for a first user. Using the same process, for a second user, a secret integer j is generated and a public point $J=j*G$ is computed. Then, the two public points or values $I=i*G$ and $J=j*G$ are exchanged over an authenticated, but not necessarily confidential communication channel. A shared secret key is computed as $K=i*(j*G)$ by the first user and as $K=j*(i*G)$ by the second user. Both users can then use K as a shared symmetric secret key for further cryptographic operations of their choice.

On both sides, the scalar point multiplication operation must be protected with respect to side-channel attacks, since a bad implementation could leak information about the respective secret keys.

In another example of cryptographic scheme, namely the Elliptic-Curve Digital Signature Algorithm ECDSA, the elliptic curve under use is also defined over the finite field with p elements, the elements of the finite field being the positive integers smaller than p and the addition and the multiplication operations being performed modulo p. Like in the ECDH example, the domain parameters can be defined as $D=(a, b, p, G, n)$. A user wishing to digitally sign a message M thanks to the ECDSA algorithm can proceed as follows. In a first step, the user generates a secret positive integer u strictly smaller than n and computes and publishes $U=u*G$. The integer u is the secret key while the point U is the public key of the user, respectively. To sign the message M, the user computes a cryptographically secure hash value $z=\text{trunc}(H(M), \text{bitlength}(n))$ where $\text{trunc}(x, \text{bitlength}(n))$ denotes the truncation to the leftmost bit length of n of the value x and H() is a cryptographically secure hash function, such as SHA-256. Then, in another step, the user generates a positive secret integer k that is strictly smaller than n thanks to a cryptographically secure random number generator and computes the point $K=k*G$. In the following, the coordinates of K are noted (Xk, Yk). In another step, the user computes $r=Xk \bmod n$ and $s=k^{-1}*(z+r*u) \bmod n$. The signature is defined as the pair of numbers r and s. To verify the signature of a received message M', the user computes a cryptographically secure hash value $z'=\text{trunc}(H(M'), \text{bitlength}(n))$, and $w=s^{-1} \bmod n$, $v1=z*w \bmod n$, $v2=r*w \bmod n$ as well as the point $(o1, o2)=v1*G+v2*U$. Eventually, the signature is considered as valid if r is equal to o1 and invalid otherwise.

It is well-known that the value of k must be kept secret and be unique for each generated signature, otherwise the ECDSA security becomes void, as the private key can be recovered. The scalar point multiplication implementation involving the computation of $K=k*G$ must be protected from side-channel attacks leaking even partial information about k.

A well-known and popular protection mechanism that can be applied on implementations of modular exponentiations or scalar point multiplication is the following. Before executing the operation, the secret value k is transformed as $k'=f1(k)=k+a*n$, where n is the element order and a is a cryptographically secure random number freshly generated at each operation, being a modular exponentiation or scalar point multiplication. Unfortunately, this protection mechanism suffers from several weaknesses: first, the value k must already be present in the implementation in clear form before its protection using a freshly generated random value a. It means that an adversary can attack that value before the protection process. Furthermore in the context of signatures, it is well-known that if the random value a is not large enough, it is still possible to attack an implementation of a modular exponentiation or a scalar point multiplication by recovering for example by Single Power/Electromagnetic analysis or a template attack on a single run or fixing by fault attack a few bits of the scalar during each signature operation. Then, using that partial knowledge, the corresponding set of collected pairs (messages, signatures) and applying lattice-reduction-based techniques, it is possible to recover the secret key.

Shown in FIG. 1 are steps of the claimed method that can be applied on any cryptographic group, either of multiplicative nature, like used in the traditional Diffie-Hellman key exchange protocol that relies on the multiplication of integers modulo a prime number p, or of additive nature, like the scalar multiplication of points on an elliptic curve. In the following description, n is the order of the base element G that has to be combined with a secret value k. In a first step two positive secret integers k1 and k2 are generated and are both strictly smaller than n thanks to a cryptographically secure random number generator, k1 and k2 do not share any common divisor with the base element order n. In other words, computing the greatest common divisor of n and k1 and of n and k2, respectively, must each time provide the result 1. The two values k1 and k2 are completely uncorrelated from the secret value k, and consequently, the value k is not required to be present, either timely or physically, when generating k1 and k2. In a second step, a protected value k' is computed as $k'=k1*k2$ and has a bit-length that is twice the bit-length of k. Then the protected secret value k' is used as a second operand in a group operation as shown in a third step in FIG. 1.

The value of k, if this step is rendered necessary by the circumstances, could be recovered by computing $k=k'$ mod n. However, the main advantage of the present disclosure is as explained above, that it does not require that this value k is present in clear in or near the implementation of a modular exponentiation or a scalar point multiplication, and thus, cannot be attacked through exploiting side-channel leakages.

The ECDH key exchange protocol is illustrated in the following embodiment as a non limitative example. Given a base point G of order n, a first step comprises generating two positive random integers i1 and i2 that are strictly smaller than the order n of the base point G thanks to a cryptographically secure random number generator. These numbers must not share any non-trivial divisor with n. Eventually, the method comprises a step of computing $i'=i1*i2$. This value is considered as a secret key for a first user. Similarly, the method comprises a step of generating two positive random integers j1 and j2 having the same bit-length than the order n of G thanks to a cryptographically secure random number generator. These numbers must also be strictly smaller than n and must not share any non-trivial divisor with n. Eventually, the method comprises a step of computing $j'=j1*j2$. This value is considered as the secret key for a second user. The sequel of the protocol runs as in the standard, unprotected version, where all the secret values are replaced by their corresponding protected version. The real values of i and j can respectively be computed as $i=i'$ mod n and $j=j'$ mod n, respectively, and are not required to be present, either timely or physically, near or in the implementation of the scalar point multiplication.

The ECDSA digital signature scheme is illustrated in the following embodiment as a non limitative example. Given a set of domain parameters D as well as a key consisting of a private part u and a public part $U=uG$, the signature process goes in an identical way as in the above description until before the moment of generating the random value k. At that point, the method comprises generating two random positive integers k1 and k2 are all strictly smaller than the order of the base point G thanks to a cryptographically secure random number generator and such that neither k1 nor k2 is sharing any common divisor other than 1 with n. The method then comprises a step of computing the protected version of k as $k'=k1*k2$. In another step the method comprises computing the point K as $K=k'*G$. The sequel of the signature and verification processes is identical as the one performed for the standard ECDSA scheme. The real value of k, that can be respectively computed as $k=k'$ mod n, is advantageously not required to be present, either timely or physically, near or in the implementation of the scalar point multiplication.

In another embodiment, a Diffie-Hellman key exchange protocol relying on Sophie-Germain primes is illustrated as a non limitative example. A prime number p of the form $p=2*q+1$ is used, where q is also a prime number. The method comprises a step of generating two positive secret integers i1 and i2 as well as j1 and j2, respectively, that are all strictly smaller than the order p−1 thanks to a cryptographically secure random number generator such that these integers do not share any divisor other than one with the value p−1. Then the method comprises a step of computing the protected secret values i' and j', wherein $i'=i1*i2$ and $j'=j1*j2$ for each user, respectively. The sequel of the protocol runs as in the standard, unprotected version, where all the secret values are replaced by their corresponding protected version. The real values of i and j can respectively be computed as $i=i'$ mod (p−1) and $j=j'$ mod (p−1), respectively, and are not required to be present, either timely or physically, near or in the implementation of the scalar point multiplication.

A Diffie-Hellman key exchange protocol relying on more general forms of primes is illustrated in the following embodiment as a non limitative example. A prime number p of the form $p=n*q+1$ is used, where q is also a prime number. The method comprises a step of generating two random integer and secret integer values i1, i2, j1 and j2 that are all strictly smaller than q, respectively, such that these integers do not share any divisor other than one with the value q, respectively, thanks to a cryptographically secure random number generator. The method then comprises a step of computing a protected secret value i' wherein $i'=i1*i2$ and j' wherein $j'=j1*j2$ for each user, respectively. The sequel of the protocol runs as in the standard, unprotected version, where all the secret values are replaced by their corresponding protected version. The real values of i and j can respectively be computed as $i=i'$ mod q and $j=j'$ mod q, respectively, and are not required to be present, either timely or physically, near or in the implementation of the scalar point multiplication.

This specification is not solely restricted to the illustrations listed above. Given a cryptographic group, written either in an additive or in a multiplicative way, a base element G of order n in this group and the group operation K, wherein for example $K=g\string^k$ when the group operation is written multiplicatively or $K=kG$ when the group operation is written additively, involving a secret element k, it is then possible to always generate a protected version k' of k as follows: the method comprises a step of generating two positive secret integers k1 and k2 that are both strictly smaller than the order n of the base element G thanks to a cryptographically secure random number generator and not sharing any other divisor with n than 1 thanks to a cryptographically secure random number generator. In another step, the method comprises computing the protected version k' of k wherein $k'=k1*k2$. The protected version k' can then safely be used as a replacement for the secret value k.

Such method may be for example implemented in a computing device such as a secure element, a Hardware Security Module HSM, a personal computer. It will be well understood that those examples are not limitative and any other computing devices as well known from the art or able to generate a protected secret value may be used to generate such protected secret value k' as described above.

The invention claimed is:

1. A method, implemented in a computing device, to generate a protected secret value k' used as a second operand in a cryptographic group operation involving a base group element G of an order n that has to be combined with a secret value k, the method comprising:
   generating random positive integers k1 and k2 in the computing device, that are strictly smaller than the order n of the base group element G due to a cryptographically secure random numbergenerator, such that the generated random positive integers k1 and k2 do not share any divisor with the order n other than 1; and
   generating the protected secret value k' in the computing device based on the generated random positive integers as $k'=k1*k2$ wherein the operation "*" denotes multiplication, the protected secret value k' being used as the second operand in the cryptographic group operation;
   wherein the secret value k, which is protected by using the protected secret value k' instead of the secret value k in the cryptographic group operation, is obtained by applying a modular reduction on the protected secret value k' modulo the order n of the base group element G; and
   wherein the generated random positive integers k1 and k2 are uncorrelated from the secret value k such that the secret value k is protected from being attacked through exploiting side-channel leakages.

2. The method of claim 1, wherein the generated random positive integers k1 and k2 have a length strictly smaller than a bit-length of the order n of the base group element G.

3. The method of claim 1, wherein the protected secret value k' is used as at least one secret parameter in a Diffie-Hellman protocol.

4. The method of claim 3, wherein the protected secret value k' is used as the at least one secret parameter in the Diffie-Hellman protocol implemented over a group of integers modulo a prime number $p=2*q+1$, wherein q is also a prime number.

5. The method of claim 3, wherein the protected secret value k' is used as the at least one secret parameter in the Diffie-Hellman protocol implemented over a group of integers modulo a prime number $p=m*q+1$, wherein q is also a prime number and m is a positive integer.

6. The method of claim 3, wherein the protected secret value k' is used as the at least one secret parameter in the Diffie-Hellman protocol implemented over a group of points on an elliptic curve defined overa finite field.

7. The method of claim 1, wherein the protected secret value k' is used as a secret random integer in an Elliptic Curve Digital Signature Algorithm (ECDSA) signature scheme.

8. The method of claim 1, wherein the protected secret value k' is used as a secret random value in a digital signature scheme involving at least one cryptographic group operation between a base element of order n and the protected secret value k'.

9. The method of claim 1, wherein the protected secret value k' is used as a secret random value in a public-key signature scheme involving at least one cryptographic group operation between a base element of order n and the protected secret value k'.

10. The method of claim 1, wherein the protected value k' is used as a secret random value in a public-key encryptions scheme involving at least one cryptographic group operation between a base element of order n and the protected secret value k'.

11. A computing device configured to generate a protected secret value k' used as a second operand in a cryptographic group operation involving a base group elementG of order n that has to be combined with a secret value k, wherein the computing device comprises a cryptographically secure random number generator, a processor and a memory; the computing device configured to:
   generate random positive integers k1 and k2, strictly smaller than the order n of the base group elementG due to the cryptographically secure random number generator, such that the generated random positive integers k1 and k2 do not share any divisor with the order n other than 1;
   generate, using the processor, the protected secret value k' based on the generating random positive integers such as $k'=k1*k2$, wherein the operation "*" denotes multiplication, the protected secret value k' being used as the second operand in the cryptographic group operation; and
   store the protected secret value k' in the memory;
   wherein the secret value k, which is protected by using the protected secret value k' instead of the secret value k in the cryptographic group operation, is obtainable by applying a modular reduction on the generated protected secret value k' modulo the order n of the base group element G; and
   wherein the generated random positive integers k1 and k2 are uncorrelated from the secret value k such that the secret value k is protected from being attacked through exploiting side-channel leakages.

* * * * *